(12) United States Patent
Sha et al.

(10) Patent No.: US 11,463,322 B1
(45) Date of Patent: Oct. 4, 2022

(54) DIGITAL TWIN ARCHITECTURE FOR INTERNET-CONNECTED DEVICE COMPUTING ENVIRONMENT

(71) Applicant: EMC IP Holding Company LLC, Hopkinton, MA (US)

(72) Inventors: Danqing Sha, Shanghai (CN); Zhen Jia, Shanghai (CN); Jinpeng Liu, Shanghai (CN); Kenneth Durazzo, Morgan Hill, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/459,707

(22) Filed: Aug. 27, 2021

(51) Int. Cl.
| | |
|---|---|
| *G06F 15/173* | (2006.01) |
| *H04L 41/14* | (2022.01) |
| *H04L 41/12* | (2022.01) |
| *H04L 41/50* | (2022.01) |
| *H04L 41/16* | (2022.01) |
| *H04L 41/147* | (2022.01) |

(52) U.S. Cl.
CPC ............ *H04L 41/145* (2013.01); *H04L 41/12* (2013.01); *H04L 41/147* (2013.01); *H04L 41/16* (2013.01); *H04L 41/5096* (2013.01)

(58) Field of Classification Search
CPC ..... H04L 41/145; H04L 41/12; H04L 41/147; H04L 41/16; H04L 41/5096
See application file for complete search history.

(56) References Cited

U.S. PATENT DOCUMENTS

| | | | | |
|---|---|---|---|---|
| 11,216,261 | B1* | 1/2022 | Moyal | G06F 21/577 |
| 2019/0356556 | A1* | 11/2019 | Vicat-Blanc | G06F 30/20 |
| 2021/0383611 | A1* | 12/2021 | Kanski | G06T 17/00 |

OTHER PUBLICATIONS

ETSI, "MEC in 5G Networks," White Paper No. 28, ISBN No. 979-10-92620-22-1, Jun. 2018, 28 pages.
ETSI, "Multi-access Edge Computing (MEC); Application Mobility Service API," Group Specification MEC 021 V2.1.1, Jan. 2020, 47 pages.
ETSI, "ETSI MEC: An Introduction," Apr. 2021, 39 pages.
U.S. Appl. No. 17/380,372 filed in the name of Danqing Sha et al. filed Jul. 20, 2021, and entitled "Digital Twin Architecture for Multi-Access Edge Computing Environment."

* cited by examiner

*Primary Examiner* — Wing F Chan
*Assistant Examiner* — Joseph R Maniwang
(74) *Attorney, Agent, or Firm* — Ryan, Mason & Lewis, LLP (57) ABSTRACT

Techniques are disclosed for generating a virtual representation (e.g., one or more digital twin models) of an internet-connected device computing environment, and managing the internet-connected device computing environment via the virtual representation. By way of example only, such techniques enable understanding, prediction and/or optimization of performance of applications and/or systems operating in the internet-connected device computing environment.

20 Claims, 5 Drawing Sheets

DIGITAL TWIN ARCHITECTURE FOR INTERNET-CONNECTED DEVICE COMPUTING ENVIRONMENT

FIELD

The field relates generally to information processing systems, and more particularly to Internet of Things (IoT)-based computing environments.

BACKGROUND

The Internet of Things (IoT) broadly refers to a vast system of internet-connected devices that are able to receive and/or collect and transfer data over a wireless network without human intervention or with minimal human intervention. The nature and purpose of such IoT devices are essentially unlimited, e.g., smart phones, laptops, vehicles, sensors, actuators, etc., in a wide variety of operational environments that form one or more IoT platforms. Typically, the wireless network to which the IoT devices connect enables the IoT devices to connect with an edge computing network (e.g., one or more edge servers).

Edge computing, considered the evolution of cloud computing, migrates the deployment of application programs (applications) from a centralized data center downward to distributed edge nodes, thereby achieving shorter distances from data generated by consumers (e.g., IoT devices) and the applications. Examples of applications include, but are not limited to, applications implementing artificial intelligence models such as, but not limited to, machine learning (ML) applications, deep learning (DL) applications, and data mining (DM) applications.

Many IoT devices and edge servers are also typically configured to utilize 3GPP 5G cellular technology to send and receive data. However, due to the varied nature and purpose of IoT devices, managing IoT-based computing environments can present significant challenges.

SUMMARY

Embodiments provide techniques for construction and management of a virtual representation of an internet-connected device computing environment. According to one illustrative embodiment, a method comprises generating a virtual representation of an internet-connected device computing environment, and managing the internet-connected device computing environment via the virtual representation.

Further illustrative embodiments are provided in the form of a non-transitory computer-readable storage medium having embodied therein executable program code that when executed by a processor causes the processor to perform the above steps. Still further illustrative embodiments comprise apparatus with a processor and a memory configured to perform the above steps.

Advantageously, illustrative embodiments provide techniques for constructing and managing a digital twin architecture in order to understand, predict and/or optimize performance of applications and/or systems operating in an internet-connected device computing environment. An example of an "internet-connected device computing environment" is an IoT-based computing environment as will be illustratively described herein.

These and other features and advantages of embodiments described herein will become more apparent from the accompanying drawings and the following detailed description.

DETAILED DESCRIPTION

Illustrative embodiments will now be described herein in detail with reference to the accompanying drawings. Although the drawings and accompanying descriptions illustrate some embodiments, it is to be appreciated that alternative embodiments are not to be construed as limited by the embodiments illustrated herein. Furthermore, as used herein, the term "includes" and its variants are to be read as open-ended terms that mean "includes, but is not limited to." The term "based on" is to be read as "based at least in part on." The term "an embodiment" and "the embodiment" are to be read as "at least one example embodiment." The terms "first," "second," and the like may refer to different or the same objects. Other definitions, either explicit or implicit, may be included below.

As mentioned above in the background section, edge computing is an emerging technology developing together with emerging 5G (3GPP 5th Generation) telecommunication network technology and equipped with many applications for a variety of functions, by way of example only, autonomous driving, mobile mixed reality, drone pilot, smart home, and virtual reality instructional tutorials and/or games, to name a few. Such applications typically need real-time responses or computing offload from servers, which cannot be adequately fulfilled by current cloud computing infrastructure. Thus, the emergence of edge computing is in response to the inability of centralized data centers to provide real-time or near-real-time compute capabilities to the vast (and growing) sources of decentralized data (so-called data "out in the wild"). Edge computing moves the computer workload closer to the consumer/data generator, i.e., to the IoT devices, to reduce latency, bandwidth and overhead for the centralized data center and intermediate switches, gateways, and servers. However, it is realized herein that understanding, predicting and optimizing performance of applications and/or other systems operating in an IoT device computing environment is challenging.

Accordingly, illustrative embodiments provide a digital twin architecture to overcome the above and other challenges. The term "digital twin" as illustratively used herein refers to a virtual representation (e.g., virtual copy) of a physical (e.g., actual or real) product, process, and/or system. By way of example, a digital twin can be used to understand, predict, and/or optimize performance of a physical product, process, and/or system in order to achieve improved operations in the computer processing environment in which the product, process, and/or system is implemented. Furthermore, a digital twin can act as a bridge between the physical and digital worlds and can be created by collecting real-time data about the physical product, process, and/or system (i.e., physical item). The data is then used to create a digital duplicate of the physical item, allowing it to be understood, analyzed, manipulated, and/or optimized.

More particularly, according to illustrative embodiments, the digital twin acts as a digital copy of the IoT devices and system and generates a 3D model and real time data/status visualization for users. Every IoT device (or object) such as, but not limited to, a wearable device, a smartphone, a vehicle, and even a sensor or an actuator, are provided with a digital twin with the aim of augmenting the physical object's capabilities and acting on its behalf when interacting with third parties. These digital twin objects are also configured to interact and autonomously establish relationships between each other, and with edge/cloud servers.

Illustrative embodiments provide for digital twins for IoT devices and a digital twin for the entire IoT system/platform, which communicate with each other to enable a collaborative management system. Illustrative embodiments also simulate different workloads/architectures and resource allocations between IoT devices and IoT edges devices, and can be used for optimization design of IoT systems between workload/latency/cost, etc. Further, illustrative embodiments provide an optimal solution for offloading data exchange between IoT devices and IoT edges, with the aim of reducing the latency between physical devices and corresponding IoT edges for efficient data exchange. Still further, intelligent algorithms in the digital twin platform perform data analysis based on historical data, real time data, and existing knowledge databases, and make optimization decisions for offloading to IoT edges, and make predictions for future trends, and provide management suggestions. Illustrative embodiments also provide remote monitoring and control, e.g., change/adjust parameters or settings for physical IoT devices by controlling the digital twin remotely.

Such digital twin features provide many benefits in an IoT-based computing environment such as, but not limited to:

(i) Conveying and updating real-time information, and increasing efficiency and accuracy for IoT platform management.

(ii) Providing a dynamic offloading solution for IoT edge computing with a tradeoff between service migration cost, latency and other parameters, based on a user's needs.

(iii) By incorporating multi-physics simulation, data analytics, and machine learning capabilities, a digital twin for an IoT platform can demonstrate the impact of system design changes, usage scenarios, environmental conditions, and other endless variables without a need for physical prototypes.

(iv) Providing an integrated IoT monitoring and management platform, which can resolve problems remotely and increase IoT management and optimization efficiency, with ease of collaboration between project members when using remote monitoring and control.

(v) Digital twins help original equipment manufacturers (OEMs) and/or other related enterprises and entities improve performance throughout a product lifecycle, increase reliability and availability, reduce risk, improve production, lower maintenance costs, and accelerate time to value.

(vi) Digital twins for IoT/edge/cloud architectures help improve system design and optimization, eliminating the need for physical prototypes, reducing development time, and improving the quality of the finalized solutions.

(vii) Digital twins can be provided as a service paradigm.

Prior to describing illustrative embodiments of a digital twin architecture and methodology for an IoT system having the above and other advantages and functionalities, some challenges will first be described below.

It is realized herein that the lack of an existing unified IoT management platform is largely due to compatibility, i.e., the different protocols of different IoT devices make it difficult for integration into one unified management platform. The IoT world consists of thousands of devices from as many brands, and each one is designed to work on a proprietary ecosystem, with separate mobile applications, tools and gateways to support them. According to illustrative embodiments, a digital twin unifies the communication and usability of IoT devices including associated network protocols, communication protocols, and data-aggregation standards, and represents all such activities of handling, processing and storing data collected by such IoT devices.

Given the large number of IoT devices and the large amount of data generated, it is not convenient and straightforward to have a two-dimensional (2D) based visualization tool. With a digital twin, everything can be visualized in a three-dimensional (3D) world, or even in augmented reality/virtual reality (AR/VR) for better visualization and user experience.

In addition, there is no optimization design and evaluation tool currently available for IoT systems which can simulate different user scenarios and propose optimized solutions.

As mentioned above, IoT edge computing solves a fundamental problem associated with the centralization of cloud architectures. While clouds are powerful for storage and processing, they create delays for IoT devices sending data back and forth. By bringing cloud computing capabilities to local devices, IoT edge computing can process data faster, preventing delays, security breaches and other concerns.

Existing solutions on offloading in IoT edge computing scenarios (e.g., decision whether a task should be performed by the IoT device or offloaded for performance by an edge server) mainly focus on designing offloading schemes to tradeoff between computation latency or other performance indicators such as transmission cost, energy consumption, etc. Existing offloading decision protocols do not consider the state of the surrounding environment of the user in offloading tasks and the time-varying nature of the environment. Existing methodologies also ignore the dynamics of the edge servers or assume the states of edge servers. Besides, the existing offloading decision is mostly based on a purely mathematical solution, and there is no simulation and machine learning based optimization.

Furthermore, there is currently no systematic architecture available which has IoT physical objects, digital twins of each IoT device, a digital twin of the entire IoT system, as well as their integration with edge/cloud (or even digital twin of multi-access edge computing/MEC, edge, cloud). In addition, communication processes among different digital twins for IoT, edge, cloud has never been considered in existing solutions, nor has proper placement of such virtual entities at the edge/cloud to cope with the distributed and limited nature of computing and storage resources of edge servers.

In existing IoT platforms, most IoT devices are working independently, and there is no connection between each device, i.e., all data are transmitted to the edge/cloud for processing or transmitted to the edge/cloud after fusion. Illustrative embodiments use peer-to-peer communications between digital twins of end devices (IoT devices), e.g., they can identify and authenticate each other directly and exchange information without the involvement of a broker, which will reduce the workload for the edge/cloud.

The IoT collects copious amounts of information that pass on as data. There are no intelligent algorithms or data analytics in existing IoT platform designs for optimizing the offloading process between IoT devices and edges, e.g., how to better allocate resources, how to optimize the location of IoT edge servers, how to reduce the total system latency, etc.

As for monitoring, maintenance of IoT devices and edges, most IT employees are not experts on all hardware, and on-site support is not always an option. If remote monitoring and control is enabled by digital twins, where the remote expert can provide live feedbacks for guided support, the total lead time for problem-solving will be significantly reduced. According to illustrative embodiments, digital twins serve as a bridge between the physical and digital world, and provide remote monitoring and control for users to control and monitor all devices remotely without going onsite physically, which can significantly increase efficiency.

Figure 1:
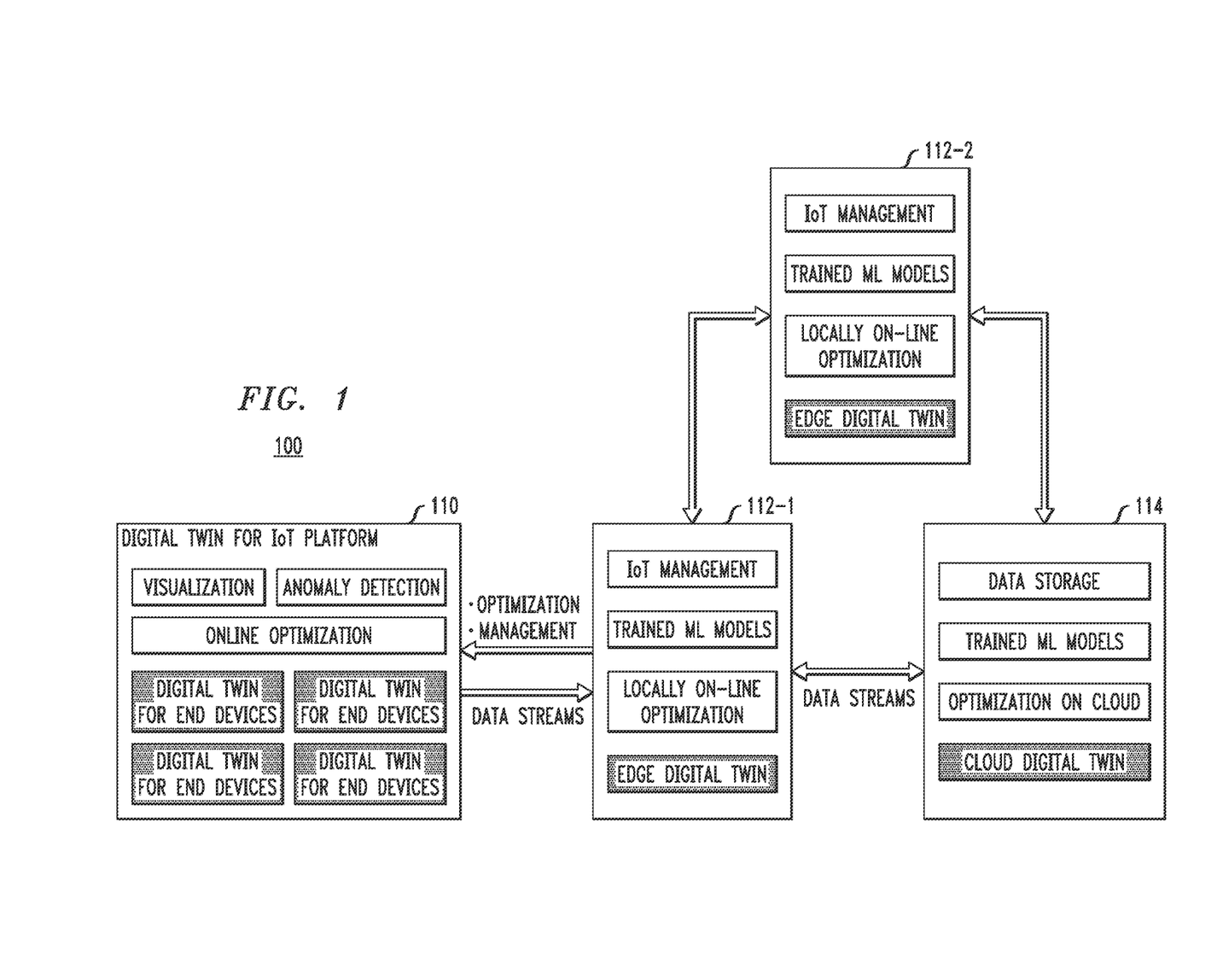
FIG. 1 illustrates a digital twin architecture for virtually representing an internet-connected device computing environment according to an illustrative embodiment.

FIG. 1 illustrates a functional block diagram of a digital twin architecture 100 according to an illustrative embodiment. More particularly, digital twin architecture 100 models the entire IoT/edge/cloud environment so as to determine ways to reduce latency and otherwise optimize the system design.

As illustratively shown, an IoT digital twin virtual component 110 represents the entire physical IoT platform which includes digital twin virtual components representing the physical IoT devices (end devices). IoT digital twin virtual component 110 is operatively coupled to an edge digital twin virtual component 112-1, which is operatively coupled to an edge digital twin virtual component 112-2 (only two edge digital twin virtual components are shown in FIG. 1 for the sake of simplicity). Edge digital twin virtual components 112-1 and 112-2 represent physical edge servers to which the physical IoT devices (end devices) are operatively coupled. Further, there is a cloud digital twin virtual component 114 for each physical cloud computing platform coupled to the physical edge servers (again, for the sake of simplicity, only one cloud digital twin virtual component is illustrated in FIG. 1).

Each digital twin virtual component in FIG. 1 models one or more functionalities of the actual devices that the virtual components represent. For example, as shown, IoT digital twin virtual component 110 provides functionalities such as, but not limited to, visualization, online optimization and anomaly detection. Further, as shown for each of edge digital twin virtual components 112-1 and 112-2 (herein collectively referred to as edge digital twin virtual components 112 and individually as edge digital twin virtual component 112), functionalities may include, but are not limited to, IoT management, execution of trained machine learning (ML) models, and local online optimization. By way of further example, for cloud digital twin virtual component 114, functionalities may include, but are not limited to, data storage, execution of trained ML models, and cloud optimization. In some embodiments, cloud digital twin virtual component 114 stores data in the cloud and provides data access as well as advanced data analytics, and empirical model learning.

It is understood that the term "online" is intended to refer to the system environment operating in real time. Thus, online optimizations may include actions determined by the digital twin architecture 100 to be applied during real-time operations of the system environment. It is to be appreciated that offline (non-real time) optimizations can also be determined and applied in accordance with illustrative embodiments.

Accordingly, real time data exchange occurs between a digital twin and the physical system or device which it represents. Digital twins (112-1 and 112-2) of edge servers will estimate edge servers' states. The digital twin (114) of the cloud server will estimate cloud servers' states. Digital twins of IoT devices will estimate end devices' states. The digital twin (110) of the entire IoT platform will provide data for the offloading decision.

Figure 2:
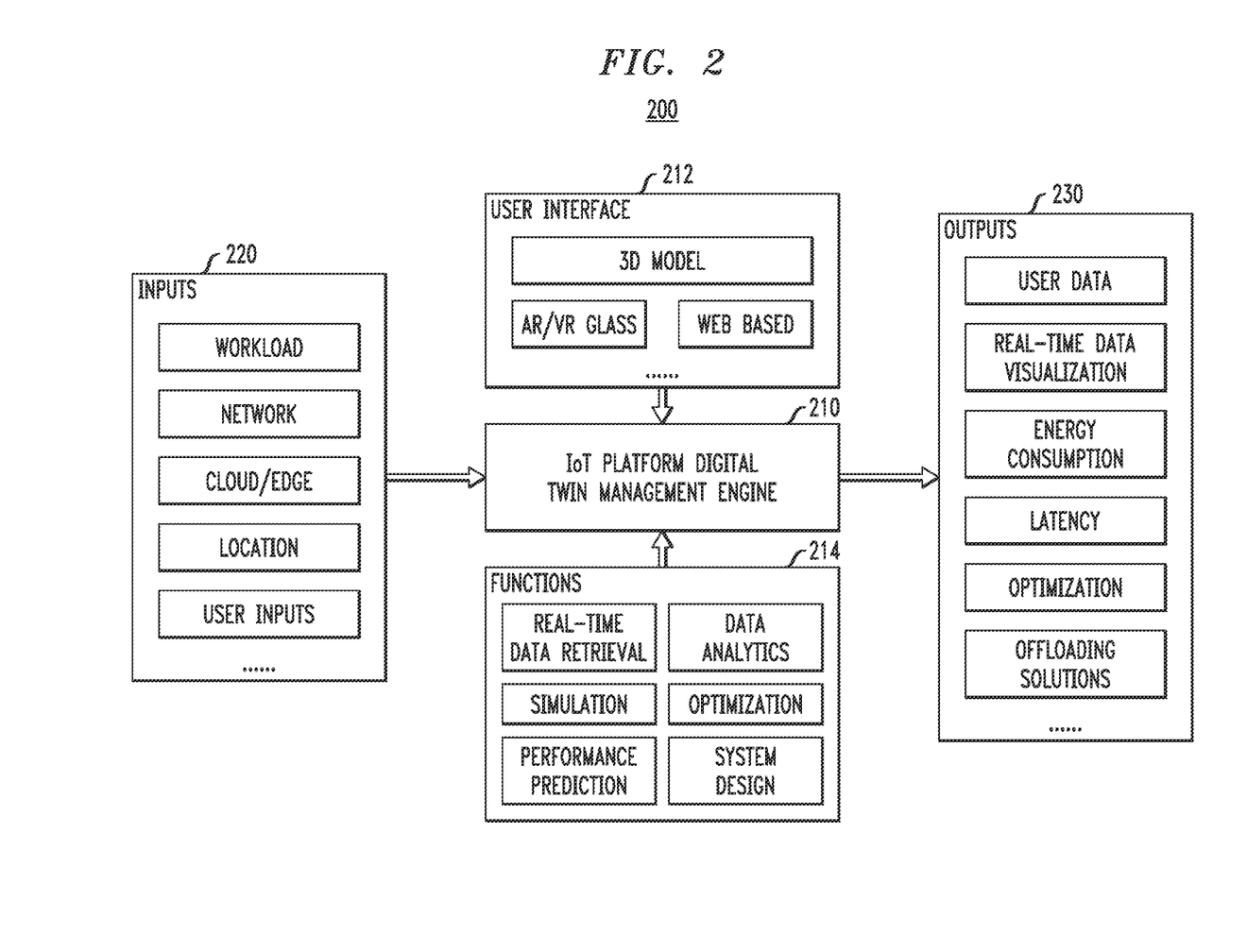
FIG. 2 illustrates a management platform for a digital twin architecture for an internet-connected device computing environment according to an illustrative embodiment.

FIG. 2 illustrates a digital twin management platform 200 for a digital twin architecture for an IoT computing system according to an illustrative embodiment. In illustrative embodiments, digital twin management platform 200 is implemented as part of IoT digital twin 110 of FIG. 1. In general, digital twin management platform 200 takes a set of parameters into consideration and provides a digital twin-based solution to model and simulate system operations so as to provide optimized solutions, better visualizations, remote control and monitoring, and other functionalities.

More particularly, as shown, digital twin management platform 200 comprises a digital twin management engine 210 with a user interface 212 and a set of functions 214. Digital twin management engine 210 receives a set of inputs 220 from the physical IoT system environment, and utilizes one or more of the set of functions 214 in conjunction with user interface 212 to generate and/or present a set of outputs 230.

The set of inputs 220 may comprise workload-related data, network-related data, cloud/edge-related data, location-related data, and/or user inputs which provide digital twin management engine 210 with information indicative of a wide variety of physical IoT system conditions including, but not limited to: a state of a surrounding environment of user devices uploading tasks; the time-varying nature of the system environment, IoT device movement trajectory; cloud/edge servers dynamics; communication and data network parameters; workloads of IoT devices; IoT device transmit power; router queuing latency; network transmission bandwidth and speed; and edge central processing unit (CPU)/virtual machine (VM) parameters. Further, the set of inputs 220 provides data indicative of a mobile offloading task including, but not limited to: the size of the offloading task; total CPU cycle number required to accomplish the offloading task; latency requirements, etc.

Digital twin management engine 210 receives the set of inputs 220 and executes one or more of the set of functions 214 including, but not limited to: real-time data retrieval; simulation; performance prediction; data analytics; optimization; and system design. Results of the execution of one or more of the set of functions 214 can be displayed or otherwise be presented via user interface 212. User interface 212, in illustrative embodiments, comprises a 3D model of the physical IoT system, a building information model (BIM), and an AR/VR glass interface portion for displaying the models. Further, the example set of outputs 230 of digital twin management engine 210 include, but are not limited to: user data; real-time data visualization; energy consumption;

latency data (including data relating to computational latency, communication latency, offloading latency, etc.); optimization design/redesign of the IoT system, offloading solutions, etc.

All or portions of the aforementioned information, as well as other data, can be leveraged to conduct system optimization so as to provide an improved IoT infrastructure which can meet demand, with lower latency, provide better use experience, with a lower cost. Furthermore, as will be explained below, illustrative embodiments support manual and automatic optimizations.

In some embodiments, manual optimization is based on simulation (e.g., simulation module in set of functions 214). For example, an IoT device can input different parameters into digital twin management engine 210 which runs a simulation and outputs simulated performance indices such as latency, service migration cost, energy consumption, etc. Based on the simulated results, a user can manually select and set up best options for offloading tasks to the physical system.

In some embodiments, automatic optimization is based on machine learning (e.g., data analytics module in set of functions 214). For example, machine learning-based intelligence integrated within digital twin management engine 210 enables operators to bring together previously unconnected systems to gain new insights, optimize the offloading process, provide intelligent offloading decisions, and monitor processes remotely. The offloading decision management generates optimal offloading decisions according to continuously monitored input information of the digital twin architecture, physical environment, and network parameters, etc.

For example, an output of set of outputs 230 comprises an optimized setup for offloading, e.g., assign certain edge servers to tasks from certain IoT devices based on current edge resources available as well as latency requirements from IoT devices. For mobile IoT devices, the optimized setup can include finding the nearest edge servers for certain IoT devices under the constraints of minimizing latency. Another output of set of outputs 230 comprises anomaly detection and prediction for the entire system and recommendations for issue resolution.

By way of further example, different schemes for an offloading decision can be considered: minimize the offloading latency under the constraint of accumulated consumed service migration cost during user mobility; and minimize the service migration cost under the constraint of offloading latency during user mobility.

As mentioned above, user interface 212 can be installed as part of an AR glass in which a user can remotely visualize a 3D model of the physical system, navigate in the model to view the structure, use gestures/controllers to retrieve real-time data or digital information, and conduct remote monitoring and control as needed. The user can also receive and manage warnings or alerts remotely via user interface 212.

If there are any alerts/warnings, or troubleshooting requests received, the user can log into digital twin management engine 210, check the alert in the system, whereby the system automatically navigates the user to the location where the problem occurs, and provides intelligent suggestions about how to deal with the issue. Multiple users can conduct remote management and/or troubleshooting together with a shared view. Advantageously, management platform 200 generates visualizations of the status/behavior of the physical system in real time, simulations and test assumptions about the offloading process, optimizations and evaluations about offloading decisions during user mobility between different edge servers, intelligent offloading decisions based upon analytics, and AR/VR based visualizations and remote control functionalities.

Advantageously, digital twin management engine 210 is configured to generate a 3D model which, in some embodiments, is a reduced order model for hardware used as a visualization and interaction interface (e.g., server, storage, switch, etc.). For various hardware scenarios, digital twin management engine 210 is also configured to generate a 3D model for racks, sensors, data center layouts or a BIM for a building. While 3D modeling has many advantages, digital twin management engine 210 can additionally or alternatively generate discrete event-based models or agent-based models. In some embodiments, digital twin management engine 210 is configured to utilize the following data for building a digital twin: historical data and real-time operation data from various sources; historical data and real-time sensing data for all IoT device; network and environmental data; user data; movement trajectory data, etc. For simulation, in some embodiments, digital twin management engine 210 utilizes IT architecture simulation software such as CloudSim or EdgeCloudSim to simulate the cloud-edge architecture and simulate performance of a given product. For analytics and prediction, in some embodiments, digital twin management engine 210 uses AI algorithms to realize anomaly prediction and determine optimal configurations. As mentioned, visualization can be AR-based, including Smart pad or AR glass, in some embodiments.

EdgeCloudSim is a simulation environment specific to edge computing scenarios. EdgeCloudSim is based on CloudSim but adds some additional functionalities such as network modeling specific to WLAN and WAN, device mobility model, and a realistic and tunable load generator. Digital twin management engine 210 is configured to utilize or otherwise adapt such simulation software to provide the following illustrative functions: modeling and simulation of large-scale cloud/edge computing environments; modeling and simulation of network connections; and simulation of the mobile offloading process. Simulation of the system environment has many benefits such as, by way of example: testing services in a repeatable and controllable environment; tuning system bottlenecks before deployment on real clouds; and simulating infrastructure to evaluate different sets of workload as well as resource performance.

Figure 3:
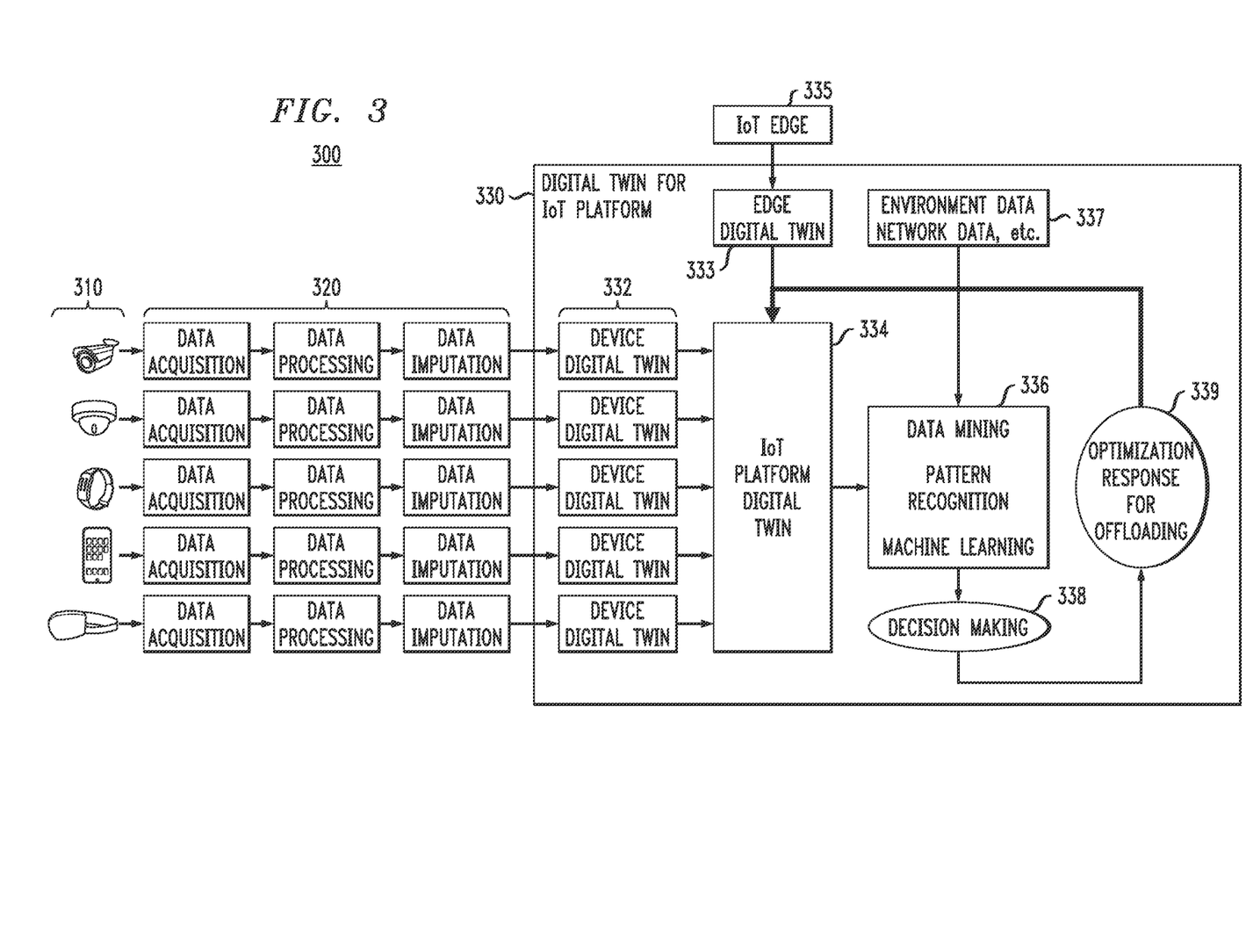
FIG. 3 illustrates further details of a digital twin architecture for an internet-connected device computing environment according to an illustrative embodiment.

FIG. 3 illustrates a digital twin architecture environment 300 for an internet-connected device computing environment according to an illustrative embodiment. As shown, each of a plurality of different IoT devices 310 respectively acquires, processes (e.g., processing here can be based on an application running on the IoT device or other processing) and otherwise conditions data (e.g., data imputation or any appropriate data quality optimization). The processed data, collectively depicted as 320, is transmitted to IoT digital twin architecture 330. More particularly, data for each IoT device 310 is provided to its corresponding device digital twin 332. Device digital twins 332 estimate the states of each IoT device 310. Edge digital twin(s) 333 estimates the state of the edge server(s), depicted as IoT edge 335, with which the IoT devices 310 connect.

The IoT platform digital twin 334 is an integration and multi-model fusion of each device digital twin 332 and act as an asset twin or component twin for entire IoT system which connects previously disconnected devices and provides data for offloading decisions with the edge servers. Data mining, pattern recognition and machine learning are performed in block 336 based on combined data provided by IoT platform digital twin 334 and other data 337 (environment, network, etc.). A decision is made in block 338 and an optimization response is generated in block 339.

As mentioned above, manual optimization based on simulation can be performed. For example, a user can input different parameters into the digital twin architecture 330 to run simulation and output a simulated performance index such as resource allocation in edge servers, latency, service migration cost, energy consumption, etc. Based on simulated results, the user can manually select and set up best options for IoT offloading to edge servers. Automatic optimization based on machine learning can also be performed. The machine learning based intelligence integrated with digital twins allows operators to bring together previously unconnected systems to gain new insights, optimize offloading process, provide intelligent offloading decisions and monitor processes remotely. The offloading decision management makes optimal offloading decisions according to the constantly considered input information of the IoT digital twin, the edge digital twin, environment and network parameters, etc. Examples of outputs include but are not limited to:

(i) Optimized setup for offloading, e.g., assign certain edge servers to tasks from certain IoT devices based on current edge resources available as well as latency requirements from IoT devices. For mobile IoT devices, this could mean finding the nearest edge for certain IoT devices under the constraints of minimizing latency.

(ii) Anomaly detection for the entire system and recommendations for issue resolving.

For example, there can be different schemes for the offloading decision: (i) minimize the offloading latency under the constraint of accumulated consumed service migration cost and energy consumption; (ii) minimize the service migration cost under the constraint of offloading latency; and (iii) minimize the offloading latency with optimized resource allocation from edge servers and lowest cost, etc.

Figure 4:
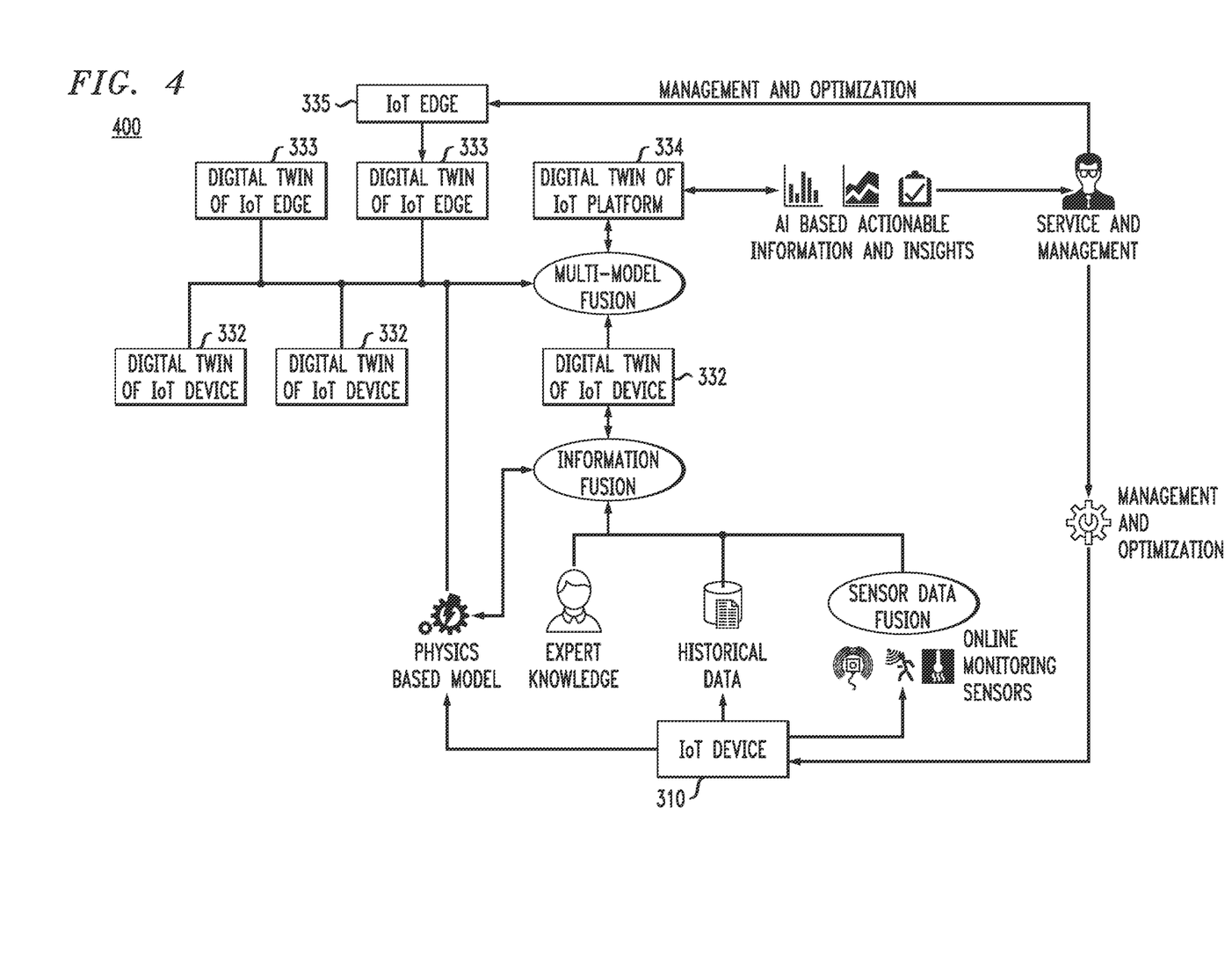
FIG. 4 illustrates a data flow for a digital twin architecture for an internet-connected device computing environment according to an illustrative embodiment.

FIG. 4 depicts an exemplary data flow 400 corresponding to the above explanation of the digital twin architecture environment 300 of FIG. 3. In sum, the digital twin architecture 300 visualizes the status/behavior of IoT devices and systems in real time, simulates and tests assumptions about the offloading process, provides intelligent offloading decisions based upon analytics, and performs remote monitoring and remote control/management.

In some embodiments, digital twin architecture 300 can utilize reduced order models for hardware and IoT devices as a visualization and interaction interface. Alternatively, discrete event-based models or agent-based models can be used to create a digital twin.

Advantageously, with the digital twin architecture, the user does not need to go to the real system to check the status, instead, he can check everything in the digital twin through remote monitoring. When there is any issue, remote collaboration can be enabled: both the onsite and remote engineer can have a shared view of the situation. If a problem is detected, they can work together remotely, and resolve the issue together. When everyone shares a common understanding of the real-time situation, the project is executed more efficiently.

The concept of digital twins for IoT systems has many benefits. With digital twins for IoT devices, digital twins for IoT edge servers, and a digital twin for the IoT system, all digital twins are able to integrate and collaborate to bring an intelligent solution to model, simulate and optimize the operation and design of IoT offloading scheme. This type of integration and collaboration provides:

(i) Better visibility: continually view operations of the system or devices, and the status of their interconnected systems.

(ii) Accurate prediction: retrieve future states from the digital twin models by using simulation or modeling.

(iii) What-if analysis: easily interact with the model to simulate unique conditions and perform what-if analysis using digital twin interfaces and obtain optimized solutions or setups. Consider the IoT device distributed placement issue, for example, a digital twin can simulate and optimize the placement of IoT devices. Normally, the IoT devices are in a distributed network to cover a large area for sensing applications. How to deploy the sensors effectively is a critical issue and before distribution of the real sensors, this tool can run simulations to define the optimal coverage strategy.

(iv) Intelligence: automatic optimization for offloading.

(v) Documentation and communication: use the digital twin model to help understand, document, and explain the behavior of a specific scenario.

Further, existing optimization for IoT devices and IoT edges are based on mathematical optimization solutions. Illustrative embodiments provide simulation capabilities of the entire system, from which a user can run different simulations and manually select optimization solutions, or utilize AI and data analytics of the tool to get the optimized solution for offloading and resource allocation.

Still further, illustrative embodiments enable multiple users to manage and troubleshoot IoT devices and edge servers together. Digital twins enable remote commissioning and diagnostics of products that are already in the field, lowering service costs and improving customer satisfaction. AR/VR can serve as a user interface to help workers easily navigate and manipulate the entire IoT system. The real time communication of ideas, concepts and the interaction while doing remote monitoring and troubleshooting enables all the parties to more quickly reach a full appreciation of current status, determine potential solutions, and visualize immediate results as quickly as possible.

Figure 5:
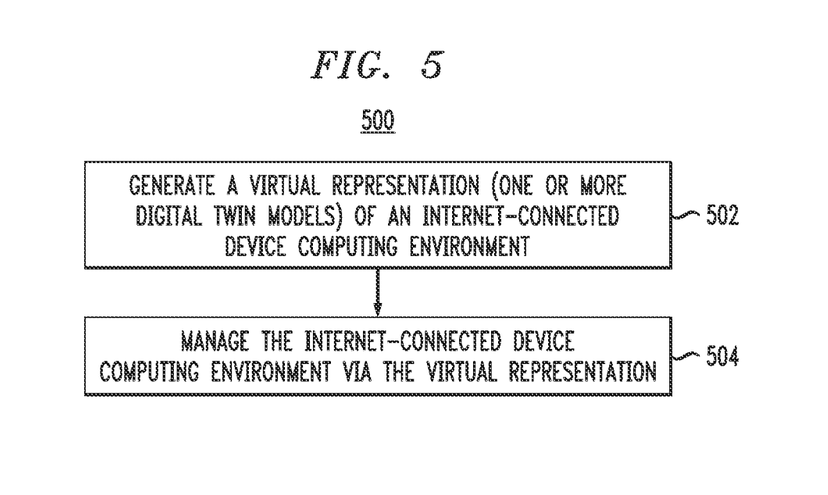
FIG. 5 illustrates a methodology for a digital twin architecture for an internet-connected device computing environment according to an illustrative embodiment.

FIG. 5 illustrates a methodology 500 for a digital twin architecture for an internet-connected device computing environment (e.g., IoT-based computing environment) according to an illustrative embodiment. Step 502 generates a virtual representation (e.g., one or more digital twin models) of an internet-connected device computing environment. Step 504 manages the internet-connected device computing environment via the virtual representation. Illustrative details and examples of these steps are explained in detail herein.

Figure 6:
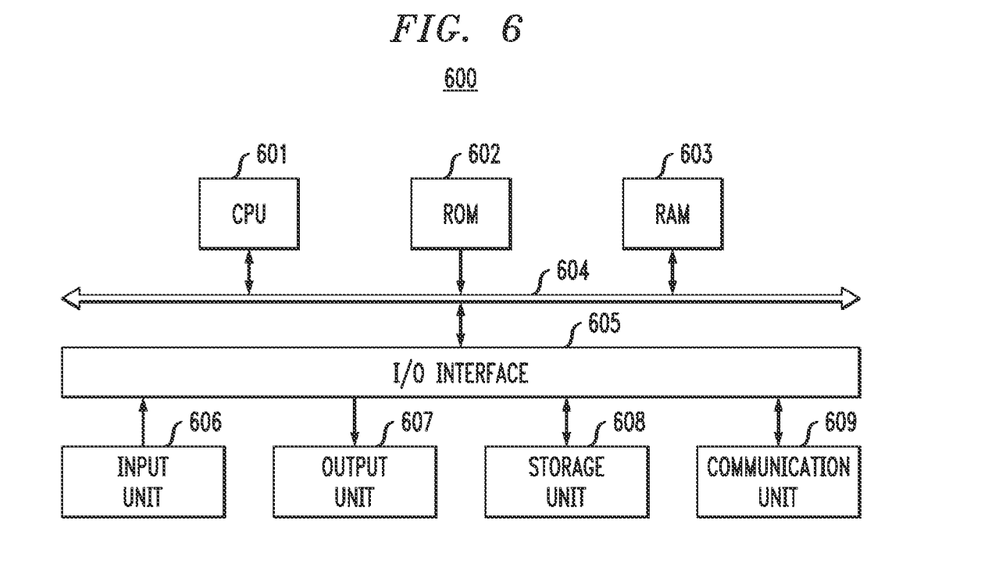
FIG. 6 illustrates a processing platform for an information processing system used to implement a digital twin architecture for an internet-connected device computing environment according to an illustrative embodiment.

FIG. 6 illustrates a block diagram of an example processing device or, more generally, an information processing system 600 that can be used to implement illustrative embodiments. For example, one or more components in FIGS. 1-5 can comprise a processing configuration such as that shown in FIG. 6 to perform steps/operations described herein. Note that while the components of system 600 are shown in FIG. 6 as being singular components operatively coupled in a local manner, it is to be appreciated that in alternative embodiments each component shown (CPU, ROM, RAM, and so on) can be implemented in a distributed computing infrastructure where some or all components are remotely distributed from one another and executed on separate processing devices. In further alternative embodiments, system 600 can include multiple processing devices, each of which comprise the components shown in FIG. 6.

As shown, the system 600 includes a central processing unit (CPU) 601 which performs various appropriate acts and processing, based on a computer program instruction stored in a read-only memory (ROM) 602 or a computer program instruction loaded from a storage unit 608 to a random access memory (RAM) 603. The RAM 603 stores therein various programs and data required for operations of the system 600. The CPU 601, the ROM 602 and the RAM 603 are connected via a bus 604 with one another. An input/output (I/O) interface 605 is also connected to the bus 604.

The following components in the system 600 are connected to the I/O interface 605, comprising: an input unit 606 such as a keyboard, a mouse and the like; an output unit 607 including various kinds of displays and a loudspeaker, etc.; a storage unit 608 including a magnetic disk, an optical disk, and etc.; a communication unit 609 including a network card, a modem, and a wireless communication transceiver, etc. The communication unit 609 allows the system 600 to exchange information/data with other devices through a computer network such as the Internet and/or various kinds of telecommunications networks.

Various processes and processing described above may be executed by the CPU 601. For example, in some embodiments, methodologies described herein may be implemented as a computer software program that is tangibly included in a machine readable medium, e.g., the storage unit 608. In some embodiments, part or all of the computer programs may be loaded and/or mounted onto the system 600 via ROM 602 and/or communication unit 609. When the computer program is loaded to the RAM 603 and executed by the CPU 601, one or more steps of the methodologies as described above may be executed.

Illustrative embodiments may be a method, a device, a system, and/or a computer program product. The computer program product may include a computer readable storage medium having computer readable program instructions thereon for causing a processor to carry out aspects of illustrative embodiments.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of illustrative embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Various technical aspects are described herein with reference to flowchart illustrations and/or block diagrams of methods, device (systems), and computer program products according to illustrative embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor unit of a general purpose computer, special purpose computer, or other programmable data processing device to produce a machine, such that the instructions, when executed via the processing unit of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing device, or other devices to cause a series of operational steps to be performed on the computer, other programmable devices or other devices to produce a computer implemented process, such that the instructions which are executed on the computer, other programmable devices, or other devices implement the functions/acts specified in the flowchart and/or block diagram block or blocks.

The flowchart and block diagrams illustrate architecture, functionality, and operation of possible implementations of systems, methods and computer program products according to various embodiments. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   generating a virtual representation of an internet-connected device computing environment, including generating a virtual representation of a device computing portion of the internet-connected device computing environment, wherein the device computing portion comprises one or more internet-connected devices; and
   managing the internet-connected device computing environment via the virtual representation;
   wherein managing the internet-connected device computing environment via the virtual representation further comprises generating, based at least in part on one or more machine learning processes integrated with the virtual representation, a recommendation for one or more task offloading decisions between the one or more internet-connected devices; and
   wherein the generating and managing steps are performed by at least one processor and at least one memory storing executable computer program instructions.

2. The method of claim 1, wherein generating a virtual representation further comprises generating a virtual representation of an edge computing portion of the internet-connected device computing environment.

3. The method of claim 2, wherein generating a virtual representation further comprises generating a virtual representation of a cloud computing portion of the internet-connected device computing environment.

4. The method of claim 3, wherein managing the internet-connected computing environment further comprises generating one or more solutions for optimizing offloading processes at least between the one or more internet-connected devices and the edge computing portion.

5. The method of claim 1, wherein managing the internet-connected device computing environment via the virtual representation further comprises simulating one or more operations of the internet-connected device computing environment.

6. The method of claim 5, wherein managing the internet-connected device computing environment via the virtual representation further comprises generating one or more visualizations of the internet-connected device computing environment in response to simulating one or more operations of the internet-connected device computing environment.

7. The method of claim 6, wherein managing the internet-connected device computing environment via the virtual representation further comprises presenting one or more visualizations of the internet-connected device computing environment on a virtual or augmented reality interface.

8. The method of claim 1, wherein managing the internet-connected device computing environment via the virtual representation further comprises predicting one or more states of the internet-connected device computing environment.

9. The method of claim 1, wherein managing the internet-connected device computing environment via the virtual representation further comprises enabling one or more clients to manage the internet-connected device computing environment remotely.

10. The method of claim 1, wherein managing the internet-connected device computing environment via the virtual representation further comprises enabling multiple clients to collaborate in managing the internet-connected device computing environment.

11. An apparatus, comprising:
    at least one processor and at least one memory storing computer program instructions wherein, when the at least one processor executes the computer program instructions, the at least one processor is configured to:
    generate a virtual representation of an internet-connected device computing environment, including generating a virtual representation of a device computing portion of the internet-connected device computing environment, wherein the device computing portion comprises one or more internet-connected devices; and
    enable management of the internet-connected device computing environment via the virtual representation;
    wherein enabling management of the internet-connected device computing environment via the virtual representation further comprises generating, based at least in part on one or more machine learning processes integrated with the virtual representation, a recommendation for one or more task offloading decisions between the one or more internet-connected device.

12. The apparatus of claim 11, wherein the apparatus is further configured to generate a virtual representation of:
    an edge computing portion of the internet-connected device computing environment; and
    a cloud computing portion of the internet-connected device computing environment.

13. The apparatus of claim 11, wherein enabling management of the internet-connected device computing environment via the virtual representation further comprises simulating one or more operations of the internet-connected device computing environment.

14. The apparatus of claim 11, wherein enabling management of the internet-connected device computing environment via the virtual representation further comprises predicting one or more states of the internet-connected device computing environment.

15. The apparatus of claim 11, wherein the virtual representation comprises one or more digital twin models of the internet-connected device computing environment.

16. A computer program product stored on a non-transitory computer-readable medium and comprising machine executable instructions, the machine executable instructions, when executed, causing a processing device to perform steps of:
  generating a virtual representation of an internet-connected device computing environment, including generating a virtual representation of a device computing portion of the internet-connected device computing environment, wherein the device computing portion comprises one or more internet-connected devices; and
  managing the internet-connected device computing environment via the virtual representation;
  wherein managing the internet-connected device computing environment via the virtual representation further comprises generating, based at least in part on one or more machine learning processes integrated with the virtual representation, a recommendation for one or more task offloading decisions between the one or more internet-connected devices.

17. The computer program product of claim 16, wherein the virtual representation comprises one or more digital twin models of the internet-connected device computing environment.

18. The computer program product of claim 16, wherein the processing device to perform steps is further configured to generate a virtual representation of:
  an edge computing portion of the internet-connected device computing environment; and
  a cloud computing portion of the internet-connected device computing environment.

19. The computer program product of claim 16, wherein managing the internet-connected device computing environment via the virtual representation further comprises simulating one or more operations of the internet-connected device computing environment.

20. The computer program product of claim 16, wherein managing the internet-connected device computing environment via the virtual representation further comprises predicting one or more states of the internet-connected device computing environment.

* * * * *